| United States Patent [19] | [11] 4,042,714 |
|---|---|
| Torres | [45] Aug. 16, 1977 |

[54] POLYDEXTROSE-BASED FARINACEOUS COMPOSITIONS

[75] Inventor: Anibal Torres, Waterford, Conn.

[73] Assignee: Pfizer Inc., New York, N.Y.

[21] Appl. No.: 707,983

[22] Filed: July 23, 1976

Related U.S. Application Data

[63] Continuation-in-part of Ser. No. 624,026, Oct. 20, 1975, abandoned.

[51] Int. Cl.$^2$ ................................................ A21D 2/06
[52] U.S. Cl. ........................................ 426/62; 426/18;
426/19; 426/549; 426/552; 426/553; 426/557;
426/656; 426/658; 426/804
[58] Field of Search ................... 426/18, 19, 549, 552,
426/553, 557, 62, 656, 658, 804

[56] References Cited

U.S. PATENT DOCUMENTS

| 3,023,104 | 2/1962 | Battista | 426/549 |
|---|---|---|---|
| 3,766,165 | 10/1973 | Rennhard | 426/548 |
| 3,843,818 | 10/1974 | Wren et al. | 426/557 |
| 3,876,794 | 4/1975 | Rennhard | 426/152 |

*Primary Examiner*—Joseph M. Golian
*Attorney, Agent, or Firm*—Francis X. Murphy; Charles J. Knuth; Allen J. Spiegel

[57] ABSTRACT

Modified polydextrose-based farinaceous compositions are disclosed which are useful in the preparation of pastas and other flour-containing foods.

7 Claims, No Drawings

POLYDEXTROSE-BASED FARINACEOUS COMPOSITIONS

CROSS-REFERENCE TO RELATED APPLICATION

This application is a continuation-in-part of my co-pending application Ser. No. 624,026, filed Oct. 20, 1975 and now abandoned.

BACKGROUND OF THE INVENTION

This invention relates to food composition. More particularly it relates to modified polydextrose-based farinaceous food compositions.

Modified polydextrose (polyglucose) is disclosed in U.S. Pat. No. 3,766,165. Its use in various dietetic foods is also disclosed in U.S. Pat. No. 3,876,794.

U.S. Pat. No. 3,766,165 disclosed that glucose polymers which can be used as dietetic food ingredients can be produced directly from glucose by a process of anhydrous melt polymerization using edible acids as catalysts and as cross-linking agents. Using this process two types of polydextrose (polyglucose), water-soluble and water-insoluble, can be simultaneously produced by anhydrous melt polymerization, and either type can be produced separately by appropriate adjustment of the initial acid concentration, this reaction duration and the reaction temperature. This invention is only concerned with the water-soluble polydextrose.

The use of the insoluble forms as a non-nutritive substitute for flour is also disclosed in U.S. Pat. No. 3,766,165. The water-soluble forms function as a replacement for sucrose in many foods but because of sobubility they cannot function as flour replacements.

SUMMARY OF THE INVENTION

It has now been discovered that a low-calorie farinaceous composition can be prepared comprising from about 20 to 75% by weight of modified polydextrose, from about 2 to 20% by weight of proteinaceous material selected from egg white, milk solids, sodium caseinate, calcium caseinate, soybean isolate, gluten and yeast, from about 10 to 40% by weight of cellulose derivative selected from alpha cellulose and microcrystalline cellulose and from about 5 to 20% by weight of flour selected from wheat, corn, rice, rye and soya bean flour; said polydextrose being a water-soluble highly-branched polydextrose wherein the linkage of 1 → 6 predominates having a number average molecular weight between about 1,500 and 18,000 and containing (a) from about 0.5 to 5 mole percent of polycarboxylic acid ester group wherein the acid is selected from the group consisting of citric, fumaric, tartaric, succinic, adipic, itaconic and malic acids and (b) from about 5 to 20% by weight of a food-acceptable polyol selected from the group consisting of sorbitol, glycerol, erythritol, xylitol, mannitol, and galactitol which is chemically bonded thereto; said composition being prepared by intimately mixing said polydextrose with said proteinaceous material in aqueous dispersion, adding and mixing said cellulose derivative and said flour, and drying the resulting mixture. This composition can be used as a replacement for some or all of the flour ordinarily used in food compositions, such as pastas, pancakes and leavened baked foods.

DETAILED DESCRIPTION OF THE INVENTION

The term modified polydextrose (MPD) as used in this specification refers to a water-soluble highly-branched polydextrose wherein the linkage of 1 → 6 predominates, having a number average molecular weight between about 1,500 and 18,000 and containing (a) from about 0.5 to 5 mole percent of polycarboxylic acid ester group wherein the acid is selected from the group consisting of citric, fumaric, tartaric, succinic, adipic, itaconic and malic acids and (b) from about 5 to 20% by weight of a food-acceptable polyol selected from the group consisting of sorbitol, glycerol, erythritol, xylitol, mannitol, and galactitol which is chemically bonded thereto. Citrated and tartrated polydextrose may be used in either the neutralized or acid forms, and the preferred forms are citrated polydextrose with sorbitol, neutralized (Type N) or acid (Type A) form. Thus the term modified polydextrose includes citrated polydextrose modified with sorbitol.

These water-soluble modified polydextroses can be combined with protein, cellulose and small amounts of flour to produce low-caloric farinaceous compositions with all of the necessary physical characteristics of flour. These new compositions are highly palatable and especially useful in the preparation of low calorie pastas, pancakes and leavened baked goods. The term "pasta" is meant to include formed and shaped products such as macaroni, lasagna, spaghetti and noodles.

Modified polydextrose-based farinaceous compositions perform similarly to wheat flour at different replacement levels, 50–100%, depending on the food system. In addition, compared to natural flours they are low-calorie compositions. These compositions allow direct replacement of at least 50% of the wheat flour in all recipes without otherwise altering either the other ingredients used or the method of preparation. The products obtained are comparable in flavor, texture and color to products containing ordinary use levels of flour.

The farinaceous compositions of the invention contain from about 20 to 75% by weight of modified polydextrose. The proteinaceous material is present in a concentration of from about 2 to 20% by weight and may for example be supplied in the form of egg white, milk solids, sodium caseinate, calcium caseinate, soybean isolates, gluten or yeast. The preferred source, however, is egg white. The cellulose derivative is present in a concentration of from about 10 to 40% by weight and may be alpha cellulose or microcrystalline cellulose. Flour is also present in a concentration of from about 5 to 20% and may for example be wheat, corn, rice, rye or soya bean flour. The preferred flours are wheat and rye. Starch may also be present as an optional ingredient in a concentration of from about 8 to 30% and may for example be a modified or unmodified corn, wheat, potato, rice or tapioca starch. However, the preferred starch is wheat starch.

The farinaceous compositions of the invention are readily prepared by intimately mixing the modified polydextrose with the proteinaceous material in aqueous dispersion, adding and mixing the cellulose derivative and the flour and drying the resulting mixture using conventional methods. The starch if present may be added before the drying step.

The invention will be more fully understood in the light of the following specific examples which are set forth below in illustration only and are not intended to be limiting.

EXAMPLE I

A modified polydextrose-based farinaceous composition was prepared according to the following formula:

| Ingredients | Grams |
|---|---|
| Egg white solids (egg albumen) | 75.00 |
| Water | 175.00 |
| Modified polydextrose, type N powder (MPD) | 500.00 |
| Microcrystalline cellulose, food grade (Avicel pH-101, FMC Corporation) | 250.00 |
| All-purpose wheat flour | 125.00 |
| Total | 1,125.00 |

The egg white solids was dissolved in water by mixing for 10–15 minutes. A fluffy white consistency was developed. The modified polydextrose was added to this and mixed for 45 minutes. A creamy smooth mixture of glossy appearance and free of lumps was obtained. The microcrystalline cellulose was then added and mixed for 20 minutes. The flour was then added and mixed in the homogeneous mixture obtaind, which had a pasty consistency. It was then spread on trays and placed in a pre-heated oven (80° C). After drying for 72 hours the material was milled to a fine powder.

The light tan powder was found to have a cereal-like odor and taste and was insoluble in water. However, it absorbed water and behaved in a manner similar to wheat flor. The following data for the milled modified polydextrose-based farinaceous composition were determined and compared to a commercially available wheat flour:

|  | MPD-Based Farinaceous Composition | Wheat Flour |
|---|---|---|
| Percent moisture | 6.80 | 12.00 |
| pH of 25% slurry | 5.65 | 5.70 |
| Water absorption(%)[1] | 40.00 | 58.70 |
| Color | light tan | off-white |
| Flavor(odor and taste) | toasted cereal | cereal |
| Fat content(%) | 0.14 | 1.00 |
| Protein content(%) | 7.60 | 10.50 |
| Digestible carbohydrates(%) | 12.82 | 76.10 |
| Calories/100 grams | 127.00 | 364.00 |

[1]Water absorption is the amount of water hydrated in the insoluble portion of the materials in excess of water exposed at 70° C for 3 hours,

EXAMPLE II

A modified polydextrose-based farinaceous composition containing food grade alpha cellulose in place of microcrystalline cellulose, was prepared in a manner similar to Example I.

| Ingredients | Grams |
|---|---|
| Modified polydextrose, Type N powder | 500.0 |
| Egg white solids | 75.0 |
| Water | 175.0 |
| Alpha cellulose (Solka Floc, food grade, Brown Company) | 250.0 |
| All-purpose wheat flour | 125.0 |
| Total | 1,125.0 |

The following is a comparison of the above composition with a commercially available wheat flour:

| Results: | MPD-Based Farinaceous Composition | Wheat Flour |
|---|---|---|
| Percent moisture in dry milled materials | 6.8 | 12.0 |
| Calories/100 grams | 127.0 | 364.0 |
| Protein content(%) | 7.6 | 10.5 |
| Fat content(%) | 0.14 | 1.0 |
| Digestible carbohydrate composition | 12.8 | 76.1 |

EXAMPLE III

Modified polydextrose-based farinaceous compositions utilizing sodium caseinate, calcium caseinate, combinations of sodium and calcium caseinate, various soya bean isolates, gluten, and baker's yeast as the proteinaceous binding agent for modified polydextrose in the fabrication of a farinaceous composition were prepared according to the general method outlined in Example I. The resultant products were also found to be similar to wheat flour.

|  |  | Formula |  |  |  |  |  |  |  |  |  |
|---|---|---|---|---|---|---|---|---|---|---|---|
| Ingredients (In Grams) | A | B | C | D | E | F | G | H | I | J | K |
| Gluten | 30 | — | — | — | — | — | — | — | — | — | — |
| Sodium caseinate | — | 30 | 7.5 | 15 | 22.5 | — | — | — | — | — | — |
| Calcium caseinate | — | — | 22.5 | 15 | 7.5 | 30 | — | — | — | — | — |
| Soybean isolate (Profan 90, Grain Processing Corp.) | — | — | — | — | — | — | 30 | — | — | — | — |
| Soybean isolate (Supro 900, Ralston Purina Co.) | — | — | — | — | — | — | — | 30 | — | — | — |
| Soybean isolate (Promide D, Central Soya Co., Inc.) | — | — | — | — | — | — | — | — | 30 | — | — |
| Soybean isolate (Promide F, Central Soya Co., Inc.) | — | — | — | — | — | — | — | — | — | 30 | — |
| Bakers yeast | — | — | — | — | — | — | — | — | — | — | 30 |
| Water | 140 | 140 | 140 | 140 | 140 | 140 | 270 | 270 | 140 | 140 | 70 |
| Modified polydextrose, type N powder | 200 | 200 | 200 | 200 | 200 | 200 | 200 | 200 | 200 | 200 | 200 |
| Microcrystalline cellulose | 100 | 100 | 100 | 100 | 100 | 100 | 100 | 100 | 100 | 100 | 100 |
| All-purpose flour | 50 | 50 | 50 | 50 | 50 | 50 | 50 | 50 | 50 | 50 | 50 |
| Totals: | 520 | 520 | 520 | 520 | 520 | 520 | 650 | 650 | 520 | 520 | 450 |

EXAMPLE IV

Modified polydextrose-based farinaceous compositions were prepared utilizing a combination proteinaceous material such as egg albumen, and modified and unmodified starches derived from either wheat, corn, tapioca, or other natural sources such as rice, potatoes, yams and cassava.

The following formulas are given to show usage levels of materials, including starch, in the fabrication of modified polydextrose-based farinaceous compositions. The same general method of preparation given in Example I was used with the exception that the starches were added after the modified polydextrose and the protein material were mixed. Physical data on the resultant milled products are also given below to show the similarity of those products relative to flour.

| Ingredients (In Grams) | Formula |  |  |  |  |  |  |  |  |  |
|---|---|---|---|---|---|---|---|---|---|---|
|  | A | B | C | D | E | F | G | H | I | J |
| Egg white solids | 27 | 27 | 27 | 27 | 27 | 27 | 124.8 | 124.8 | 124.8 | 124.8 |
| Water | 124.8 | 124.8 | 124.8 | 124.8 | 124.8 | 124.8 | 124.8 | 124.8 | 124.8 | 124.8 |
| Modified Polydextrose, type NP | 355.1 | 355.1 | 355.1 | 355.1 | 355.1 | 355.1 | 355.1 | 355.1 | 355.1 | 355.1 |
| Microcrystalline cellulose (Avicel, pH 101, FMC Corp.) | 136.4 | 136.4 | 136.4 | 136.4 | 136.4 | 136.4 | 136.4 | 136.4 | 136.4 | 136.4 |
| All-purpose flour | 44.6 | 44.6 | 44.6 | 44.6 | 44.6 | 44.6 | 44.6 | 44.6 | 44.6 | 44.6 |
| Unmodified wheat starch | 112.1 | — | — | — | — | — | — | — | — | — |
| Modified corn starch(Resista, Staley Mfg. Co.) | — | 112.1 | — | — | — | — | — | — | — | — |
| Modified corn starch(Consista, Staley Mfg. Co.) | — | — | 112.1 | — | — | — | — | — | — | — |
| Modified corn starch(Thin & Thick, Staley Mfg. Co.) | — | — | — | 112.1 | — | — | — | — | — | — |
| Modified corn starch(Dura Gel, Staley Mfg. Co.) | — | — | — | — | 112.1 | — | — | — | — | — |
| Modified corn starch(Frya Snack, Corn Products Company) | — | — | — | — | — | 112.1 | — | — | — | — |
| Modified corn starch(Dry Short, Corn Products Company) | — | — | — | — | — | — | 112.1 | — | — | — |
| Modified corn starch(Amaizo Quick Set, Corn Products Company) | — | — | — | — | — | — | — | 112.1 | — | — |
| Modified tapioca starch | — | — | — | — | — | — | — | — | 112.1 | — |
| Pregelatinized wheat starch | — | — | — | — | — | — | — | — | — | 112.1 |
| Total: | 800 | 800 | 800 | 800 | 800 | 800 | 800 | 800 | 800 | 800 |

| Results | A | B | C | D | E | F | G | H | I | J |
|---|---|---|---|---|---|---|---|---|---|---|
| Dried 72 hrs. at 70° C (Yield in Grams) | 698 | 686 | 680 | 698 | 699 | 695 | 699 | 698 | 705 | 692 |
| Percent moisture (Dry milled) | 6.0 | 4.2 | 3.3 | 4.8 | 5.7 | 5.3 | 6.0 | 5.6 | 7.0 | 5.2 |
| pH (25% slurry) | 6.1 | 6.0 | 6.1 | 6.0 | 6.1 | 6.0 | 6.1 | 6.0 | 6.0 | 6.0 |
| Color | light tan ————————————————→ off-white | | | | | | | | | |

EXAMPLE V

Modified polydextrose-based farinaceous compositions with color, organoleptic and physical properties and behavior similar to that of Examples I, II, and III were obtained utilizing modified polydextrose Type A (acid form) in place of the bleached and neutralized form.

EXAMPLE VI

Onion-flavored rings were formulated with the eleven modified polydextrose-based farinaceous compositions described in Example III (i.e., containing respectively gluten, sodium caseinate, calcium caseinate, soybean isolates, baker's Yeast, and various combinations of sodium and calicum caseinate). Standard control onion-flavored rings were used to establish the functionality of these modified polydextrose compositions. The compositions for standard and experimental onion-flavored rings are given below. In these applications all modified polydextrose-based farinaceous substitutes were used at 75% wheat flour replacement levels with satisfactory results from the standpoint of flavor, texture, and color. These observations were made when the finished products were compared to the standard control.

The all-purpose flour, wheat gluten, black pepper, salt, onion powder, and modified polydextrose-based farinaceous composition were preblended in a mixer. Each composition was blended and then mixed until a homogeneous mixture was obtained (approximately 5 minutes). The bottom and sides of the bowl and paddle was scraped, water added, and mixing continued for an additional 5 to 10 minutes. A thick moist dough developed. The blended mass was extruded through a die orifice 1/16-inch in diameter. The ribbon of the extruded dough was then cut to 6-inch lengths and formed into rings. Each of the rings was dusted with the 200 Mesh modified polydextrose-based farinaceous composition specified in each of the formulated products of Recipe II or with flour in the case of the composition in Recipe I. The rings were then deep-fried in an oil bath at 180° C for about 3 minutes until a golden yellow color with desirable texture and appearance was obtained. The resulting products had a moisture content of approximately 5%.

| Ingredients | Recipe I Standard (control) | Recipe II MPD Composition Described in Example III |
|---|---|---|
| Dry milk solids | 21.0 | 21.0 |
| All-purpose flour | 124.7 | 31.2 |
| Wheat gluten | 4.2 | 4.2 |
| Black pepper powder | .3 | .3 |
| Salt | 5.6 | 5.6 |
| Onion powder | 11.4 | 11.4 |
| Butter | 9.7 | 9.7 |
| Water | 71.3 | 71.3 |
| MPD-based farinaceous compositions | — | 93.5 |
| Totals: | 248.2 Grams | 248.2 Grams |

EXAMPLE VII

Noodles were prepared utilizing each of the modified polydextrose-based farinaceous compositions described in Example IV. For each of the modified polydextrose-based compositions a noodle formulation (Recipe II) was prepared in which the modified polydextrose-based farinaceous compositions were used as a total replacement (100%) for the semolina and wheat flour normally used in noodles and pasta formulations (Recipe I). The noodles produced were compared to the standard after drying to 10% moisture content. In addition, they were boiled in a 2% solution of sodium chloride for 20 minutes. Again the noodles were compared to the standard for color, texture, and flavor similarity. In addition the water absorption rate of the noodles was established after boiling for 20 minutes at 100° C. The results indicated that these flour compositions at 100% replacement levels were quite acceptable from the standpoint of texture and flavor, and comparable to the standard practical levels of semolina and wheat flour. Such observations were recorded after the noodles were fabricated and dried to a moisture content of 10%, as well as after being cooked for 20 minutes. The color of the standard noodles was slightly lighter than the noodles containing the various modified polydextrose-based farinaceous compositions. The latter were found to absorb an average of 5% more moisture than the standard.

| Ingredients | Recipe I Standard | Recipe II Containing one of the experimental farinaceous compositions described in Example IV |
|---|---|---|
| Semolina(Farina) flour | 100.00 | — |
| Wheat flour | 51.5 | — |
| MPD composition(from Example IV) | — | 151.5 |
| Whole eggs (fresh) | 46.0 | 46.0 |
| Salt | 1.0 | 1.0 |
| Corn oil | 3.0 | 3.0 |
| Water | 9.5 | 9.5 |
| Totals: | 211.0 Gms. | 211.0 Gms. |

Basically the preparation of the above noodles consisted of first preblending the dry ingredients (semolina, wheat flour, and salt in Recipe I, or salt and modified polydextrose-based farinaceous composition in Recipe II), adding the whole eggs, oil and water, and mixing these ingredients together for 5 to 10 minutes. The resultant dough was kneaded to obtain a plastic homogeneous mass and then extruded through dies under pressure in such a way that the product emerges in long ribbons. After extrusion, the noodles were dried to approximately a 10% moisture content and sealed in cellophane bags.

EXAMPLE VIII

Pancakes were made by incorporating each of the modified polydextrose-based farinaceous composition described in Example I using the following proportions of ingredients and according to the directions given below.

| Ingredients | Grams |
|---|---|
| MPD composition (described in Example I) | 109.0 |
| Modified polydextrose type N | 45.0 |
| Sodium bicarbonate | 1.0 |
| Glucono-delta-lactone | 2.0 |
| Non-fat milk solids | 10.0 |
| Fresh whole eggs | 50.0 |
| Sodium saccharin | 0.1 |
| Salt | 2.5 |
| Water | 69.0 |
| Total | 288.6 |

The modified polydextrose-based farinaceous composition, modified polydextrose, sodium bicarbonate, glucono-delta-lactone, sodium saccharin, and non-fat milk solids were mixed until a homogenous mixture was obtained, about 5 minutes. The water was added and mixed for an additional 2–3 minutes. Whole eggs were added and mixing continued for an additional 2–3 minutes. Two full tablespoons were poured on pre-greased, pre-heated (350° F) pancake griddle and allowed to cook until bubbles appeared on surface of pancakes (2–3 minutes). They were then turned and browned on the opposite side for approximately the same amount of time.

The resultant products were found to have an acceptable color, flavor, and texture and was rated very similar in all respects to a standard pancake made with wheat flour, sugar, baking powder, whole milk, whole eggs, and butter.

EXAMPLE IX

Breads using each of the MPD-based farinaceous compositions described in Example V were prepared according to the following formula.

| Ingredients | Grams |
|---|---|
| Enriched all-purpose flour | 125.00 |
| MPD-based composition, Example V | 125.00 |
| Instant dry yeast | 6.25 |
| Granulated sugar | 20.00 |
| Non-fat milk solids | 5.00 |
| Salt | 4.50 |
| Calcium phosphate, monobasic | 0.50 |
| Emulsified shortening | 8.20 |
| Azodicarbamide, 0.1% solution | 2.83 |
| Potassium Bromate, 0.45% solution | 2.50 |
| Sodium stearoyl-2-lactylate | 0.50 |
| Water, 60° C. | 113.72 |
| Total | 414.00 |

All the ingredients were thoroughly mixed. Subsequently the dough produced was transferred to pre-greased bread pans, covered and placed in a warm (approximately 60° C) moist area and allowed to ferment for 2½ hours. The risen dough was removed from the pans and placed on a working surface. The dough was punched and molded into the desired shape and replaced in the pre-greased pans. The bread dough was allowed to attain full proof by permitting it to ferment at 60° C for an additional 2½ hours. It was then baked at 430° C for 18 minutes.

The resultant breads had the appearance, texture, and flavor of home-made bread.

What is claimed is:

1. A low-calorie farinaceous composition comprising from about 20 to 75% by weight of modified polydextrose, from about 2 to 20% by weight of proteinaceous material selected from egg white, milk solids, sodium caseinate, calcium caseinate, soybean isolate, gluten and yeast, from about 10 to 40% by weight of cellulose derivative selected from alpha cellulose and micro-crystalline cellulose and from about 5 to 20% by weight of flour selected from wheat, corn, rice, rye and soya bean flour; said polydextrose being a water-soluble highly-branched polydextrose wherein the linkage of 1 → 6 predominates having a number average molecular weight between about 1,500 and 18,000 and containing (a) from about 0.5 to 5 mole percent of polycarboxylic acid ester group wherein the acid is selected from the group consisting of citric, fumaric, tartaric, succinic, adipic, itaconic and malic acids and (b) from about 5 to 20% by weight of a food-acceptable polyol selected from the group consisting of sorbitol, glycerol, erythritol, xylitol, mannitol, and galactitol which is chemically bonded thereto, said composition being prepared by intimately mixing said polydextrose with said proteinaceous material in aqueous dispersion, adding and mixing said cellulose derivative and said flour, and drying the resulting mixture.

2. The composition of claim 1 wherein starch is also present.

3. The composition of claim 1 wherein said proteinaceous material is egg white.

4. The composition of claim 1 wherein said flour is selected from wheat or rye flour.

5. A low-calorie pasta product comprising the composition of claim 1.

6. A low-calorie pancake product comprising the composition of claim 1.

7. A low-calorie leavened baked food comprising the composition of claim 1.

* * * * *